ELECTRIC DELAY NETWORK
Filed Dec. 13, 1954 10 Sheets-Sheet 1
Fig. 1
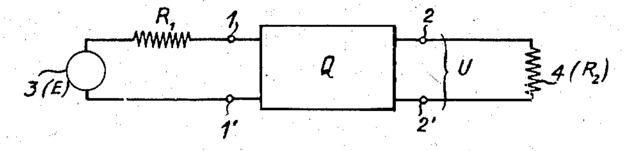
Fig. 2
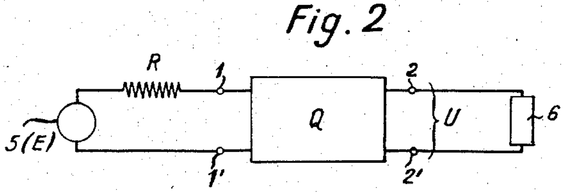
Fig. 3
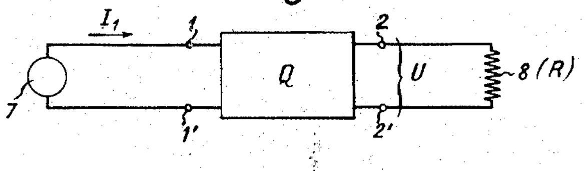
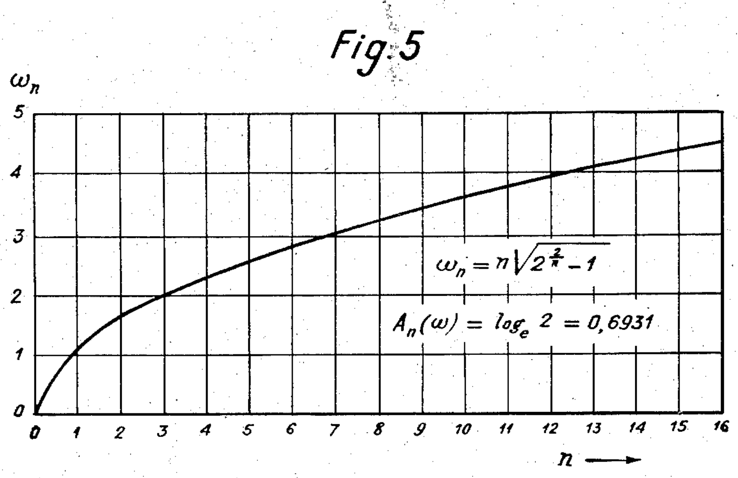

Jan. 13, 1959 M. D. INDJOUDJIAN 2,869,083

ELECTRIC DELAY NETWORK

Filed Dec. 13, 1954 10 Sheets-Sheet 3

$$A_n(\omega) = \frac{n}{2} \log_e \left(1 + \frac{\omega^2}{n^2}\right)$$

| ω \ n | 1 | 2 | 3 | 4 | 5 | 6 | 7 |
|---|---|---|---|---|---|---|---|
| 0,20 | 0,02 | 0,01 | 0,01 | 0,005 | - | - | - |
| 0,30 | 0,04 | 0,02 | 0,01 | 0,01 | 0,01 | 0,01 | 0,01 |
| 0,40 | 0,07 | 0,04 | 0,03 | 0,02 | 0,02 | 0,02 | 0,01 |
| 0,50 | 0,11 | 0,05 | 0,04 | 0,03 | 0,02 | 0,02 | 0,02 |
| 1,00 | 0,35 | 0,22 | 0,16 | 0,12 | 0,10 | 0,08 | 0,07 |
| 1,50 | 0,59 | 0,45 | 0,36 | 0,26 | 0,22 | 0,18 | 0,15 |
| 2,00 | 0,81 | 0,69 | 0,55 | 0,45 | 0,37 | 0,32 | 0,27 |
| 2,50 | 0,99 | 0,94 | 0,79 | 0,66 | 0,56 | 0,48 | 0,42 |
| 3,00 | I,15 | I,18 | 1,04 | 0,89 | 0,77 | 0,67 | 0,59 |
| 3,50 | 1,29 | 1,40 | 1,29 | 1,14 | 1,00 | 0,88 | 0,78 |
| 4,00 | 1,42 | 1,61 | 1,53 | 1,39 | 1,23 | 1,10 | 0,99 |
| 4,50 | 1,53 | 1,80 | 1,77 | 1,64 | 1,48 | 1,34 | 1,21 |
| 5,00 | 1,63 | 1,98 | 1,99 | 1,88 | 1,73 | 1,58 | 1,44 |
| 5,50 | 1,72 | 2,15 | 2,21 | 2,12 | 1,98 | 1,83 | 1,68 |
| 6,00 | 1,81 | 2,30 | 2,41 | 2,36 | 2,23 | 2,08 | 1,93 |
| 6,50 | 1,88 | 2,45 | 2,61 | 2,58 | 2,47 | 2,33 | 2,18 |

Fig. 13

$$\tau_n(\omega) = \frac{1}{1 + \frac{\omega^2}{n^2}}$$

| ω \ n | 1 | 2 | 3 | 4 | 5 | 6 | 7 |
|---|---|---|---|---|---|---|---|
| 0,20 | 0,96 | 0,99 | 1 | 1 | 1 | 1 | 1 |
| 0,30 | 0,91 | 0,98 | 0,99 | 0,99 | 0,99 | 1 | 1 |
| 0,40 | 0,86 | 0,96 | 0,98 | 0,99 | 0,99 | 1 | 1 |
| 0,50 | 0,80 | 0,94 | 0,97 | 0,99 | 0,99 | 0,99 | 0,99 |
| 1 | 0,50 | 0,80 | 0,90 | 0,94 | 0,96 | 0,97 | 0,98 |
| 1,5 | 0,31 | 0,64 | 0,80 | 0,87 | 0,92 | 0,94 | 0,96 |
| 2 | 0,20 | 0,50 | 0,69 | 0,80 | 0,86 | 0,90 | 0,93 |
| 2,5 | 0,14 | 0,39 | 0,59 | 0,72 | 0,80 | 0,85 | 0,89 |
| 3 | 0,10 | 0,31 | 0,50 | 0,64 | 0,74 | 0,80 | 0,85 |
| 3,5 | 0,08 | 0,25 | 0,42 | 0,57 | 0,67 | 0,75 | 0,80 |
| 4 | 0,06 | 0,20 | 0,36 | 0,50 | 0,61 | 0,69 | 0,76 |
| 4,5 | 0,05 | 0,17 | 0,30 | 0,44 | 0,55 | 0,64 | 0,71 |
| 5 | 0,04 | 0,14 | 0,26 | 0,39 | 0,50 | 0,59 | 0,66 |
| 5,5 | 0,03 | 0,12 | 0,23 | 0,35 | 0,45 | 0,54 | 0,62 |
| 6 | 0,03 | 0,10 | 0,20 | 0,31 | 0,41 | 0,50 | 0,58 |
| 6,5 | 0,02 | 0,09 | 0,18 | 0,28 | 0,37 | 0,46 | 0,54 |

Fig. 14

$$a_1 = \frac{1}{n^2}$$

$$b_1 = \frac{3}{n^2-1}$$

$$a_2 = \frac{5(n^2-1)}{n^2(n^2-4)}$$

$$b_2 = \frac{7(n^2-4)}{(n^2-1)(n^2-9)}$$

$$a_3 = \frac{9(n^2-1)(n^2-9)}{n^2(n^2-4)(n^2-16)}$$

$$b_3 = \frac{11(n^2-4)(n^2-16)}{(n^2-1)(n^2-9)(n^2-25)}$$

$$\cdots\cdots\cdots\cdots$$

$$a_k = \frac{(4k-3)(n^2-1)(n^2-9)\cdots\cdots[n^2-(2k-3)^2]}{n^2(n^2-4)(n^2-16)\cdots\cdots[n^2-(2k-2)^2]}$$

$$b_k = \frac{(4k-1)(n^2-4)(n^2-16)\cdots\cdots[n^2-(2k-2)^2]}{(n^2-1)(n^2-9)(n^2-25)\cdots\cdots[n^2-(2k-1)^2]}$$

$$\cdots\cdots\cdots\cdots$$

$$n=2q-1 \quad \begin{cases} a_{\frac{n+1}{2}} = \dfrac{(2n-1)(n^2-1)(n^2-9)\cdots\cdots 4(n-1)}{n^2(n^2-4)(n^2-16)\cdots\cdots(2n-1)} \\[2ex] b_{\frac{n-1}{2}} = \dfrac{(2n-3)(n^2-4)(n^2-16)\cdots\cdots 3(n-3)}{(n^2-1)(n^2-9)(n^2-25)\cdots\cdots 4(n-1)} \end{cases}$$

$$n=2q \quad \begin{cases} a_{\frac{n}{2}} = \dfrac{(2n-3)(n^2-1)(n^2-9)\cdots\cdots 3(n-3)}{n^2(n^2-4)(n^2-16)\cdots\cdots 4(n-1)} \\[2ex] b_{\frac{n}{2}} = \dfrac{(2n-1)(n^2-4)(n^2-16)\cdots\cdots 4(n-1)}{(n^2-1)(n^2-9)(n^2-25)\cdots\cdots(2n-1)} \end{cases}$$

Fig. 15

ELECTRIC DELAY NETWORK

Filed Dec. 13, 1954 10 Sheets-Sheet 9

| n | $a_1$ | $b_1$ | $a_2$ | $b_2$ | $a_3$ | $b_3$ | $a_4$ | $b_4$ | $a_5$ |
|---|---|---|---|---|---|---|---|---|---|
| 1 | 1,000000 | | | | | | | | |
| 2 | 0,250000 | 1,000000 | | | | | | | |
| 3 | 0,111111 | 0,375000 | 0,888888 | | | | | | |
| 4 | 0,062500 | 0,200000 | 0,390625 | 0,800000 | | | | | |
| 5 | 0,040000 | 0,125000 | 0,228571 | 0,382812 | 0,731428 | | | | |
| 6 | 0,027778 | 0,085714 | 0,151910 | 0,237037 | 0,369141 | 0,677249 | | | |
| 7 | 0,020408 | 0,062500 | 0,108843 | 0,164063 | 0,237475 | 0,354492 | 0,633267 | | |
| 8 | 0,015625 | 0,047619 | 0,082031 | 0,121121 | 0,169189 | 0,234432 | 0,340393 | 0,596737 | |
| 9 | 0,012346 | 0,037500 | 0,064134 | 0,093576 | 0,127872 | 0,170681 | 0,229854 | 0,327301 | 0,565795 |

Fig. 16

| n | $a_1$ | $b_1$ | $a_2$ | $b_2$ | $a_3$ | $b_3$ | $a_4$ | $b_4$ | $a_5$ |
|---|---|---|---|---|---|---|---|---|---|
| 1 | 2,000000 | | | | | | | | |
| 2 | I,707I07 | 0,292893 | | | | | | | |
| 3 | I,457065 | 0,422650 | 0,120285 | | | | | | |
| 4 | I,287273 | 0,4343I3 | 0,2I2726 | 0,065689 | | | | | |
| 5 | I,I64509 | 0,422699 | 0,24I3II | 0,I30I66 | 0,04I393 | | | | |
| 6 | I,07086I | 0,405905 | 0,249I7I | 0,I57330 | 0,0882I6 | 0,0285I8 | | | |
| 7 | 0,9965 | 0,3887 | 0,2490 | 0,1694 | 0,1116 | 0,0639 | 0,0208 | | |
| 8 | 0,9357 | 0,3725 | 0,2453 | 0,1744 | 0,1241 | 0,0837 | 0,0485 | 0,0159 | |
| 9 | 0,8847 | 0,5576 | 0,2393 | 0,1765 | 0,1307 | 0,0953 | 0,0652 | 0,038I | 0,0125 |

Fig. 17

United States Patent Office 2,869,083
Patented Jan. 13, 1959

2,869,083

ELECTRIC DELAY NETWORK

Mardiros Dickran Indjoudjian, Vincennes, France

Application December 13, 1954, Serial No. 474,949

Claims priority, application France December 22, 1953

6 Claims. (Cl. 333—29)

The present invention relates to a delay network of the ladder type comprising series inductances and shunt condensers (said inductances and said condensers being designated under the generic term of "elements"), and its object is an embodiment of such a network in which the delay undergone by the signals passing therethrough, is substantially constant and independent of the frequency of said signals, within wider frequency limits than is the case for ladder type delay networks already known.

It will be agreed to designate, hereinafter, by $\omega$ the angular frequency of the signals applied, by $j$ the imaginary unit ($j^2=-1$), by $\tau$ the desired delay time, and by $p$ the product $j\omega\tau$ and besides to designate by the name of "transfer function" $T(p)$ the ratio between the electromotive force of a signal with an angular frequency $\omega$ applied at the input to said network and the electric voltage at the output therefrom or, otherwise, a quantity differing from this ratio only by a constant numerical factor, the input and output terminals of said network being closed respectively on specified resistances.

An ideal delay network would obviously be one the transfer function of which, with the above notation, would be represented by $e^p$. The Laplace transform, with $p$ as a variable, of the signal applied at the input to the network, is then multiplied by $e^{-p}$ for giving the Laplace transform of the output signal. Now when two image functions (Laplace transforms) differ only by a factor $e^{-p}$, the original functions which represent the signals are respectively $E'(t)$ and $E(t-\tau)$ and consequently the output signal $E(t-\tau)$ reproduces without any deformation the input signal $E(t)$ with a delay equal to $\tau$. By a suitable choice of the total number $n$ of elements of the delay network, it is possible to approach this ideal case as closely as desired. In the conventional modes of construction of delay networks, however, the number $n$ of necessary elements is very large.

According to the invention, it is possible to realize a delay network having, to a practically sufficient approximation the desired properties, using a restricted number $n$ of elements. This delay networks differs from conventional networks in that it does not have an iterative structure, i. e. it is not formed of sections assembled ladder like with identical structures. On the contrary, its elements of successive ranks have different values which will be made clear hereinafter as well as their method of calculation. It will be seen that the delay network of the invention may be determined for any values of its resistive terminations.

The delay network of the invention, however, is of special interest for two practical types of terminations. In the first type, the source and the load circuit have resistances of the same value R. In the second one, the source has a finite resistance R and the load circuit has an infinite impedance or vice versa. In both cases, the values of the reactances of the network elements are calculated taking as a resistance unit the value of the termination resistance or resistances which are not infinite, i. e. the values found for the reactances will be reduced values referred to R.

Conventionally, the delay $\tau$ caused by the network will be hereinafter taken as a time unit and the units in which the angular frequencies are to be expressed will be chosen in consequence. For instance, if it is desired to build a delay network having a delay of one micro-second, the calculations will be effected expressing the angular frequencies in radians per micro-second.

In accordance with the present invention, a ladder type delay network is provided comprised of a total number $n$ of series inductances and shunt condensers, having a delay time the value of which is substantially independent of the frequency of the signals applied to said network, characterized in that the ratio between the electromotive force or current of a source of signals with an angular frequency $\omega$ connected to the input to said network and the voltage or current delivered to a load impedance connected to the output from said network, said network being closed at its input and output terminals on predetermined resistances $R_1$ and $R_2$, is substantially equal, designating by $p$ the quantity $j\omega\tau$, to the product of a constant factor by $$T(p)=\left(1+\frac{p}{n}\right)^n$$

Methods for calculating the values of the inductances and condensers forming the network so as to meet the condition just given will be explained hereinafter.

The delay network according to the invention, consisting of $n$ elements comprises, if $n$ is even $n/2$ L-type sections; if $n$ is odd, it comprises an additional element which is either a shunt condenser in one type of network or a series inductance in the type of network derived from the first one by duality as is well known in the theory of ladder type networks.

In the calculations given hereinafter, the values of the network elements will be expressed from their reactances referred to the angular frequency $$\omega_0=\frac{1}{\tau}$$

and with an impedance unit equal to the above mentioned resistances R or $R_1$.

The invention will be better understood from the detailed description now about to be given and from an inspection of the appended drawings, wherein:

Figure 1 represents a delay network according to the invention, inserted between a source and a load or utilization circuit having respectively resistances of values $R_1$ and $R_2$;

Figure 2 represents this same delay network inserted between a source having a finite resistance R and an infinite load impedance;

Figure 3 shows this same delay network inserted between a current source having an infinite internal impedance and a load having a finite resistance R;

Figure 5 is a curve which represents the "6 db band width" of the network as a function of $n$, i. e. the width of the frequency band at the maximum frequency of which the attenuation introduced by the network in 6 decibels;

Figures 13 to 17 give formulae and numerical values facilitating calculation of the networks.

Figure 4:
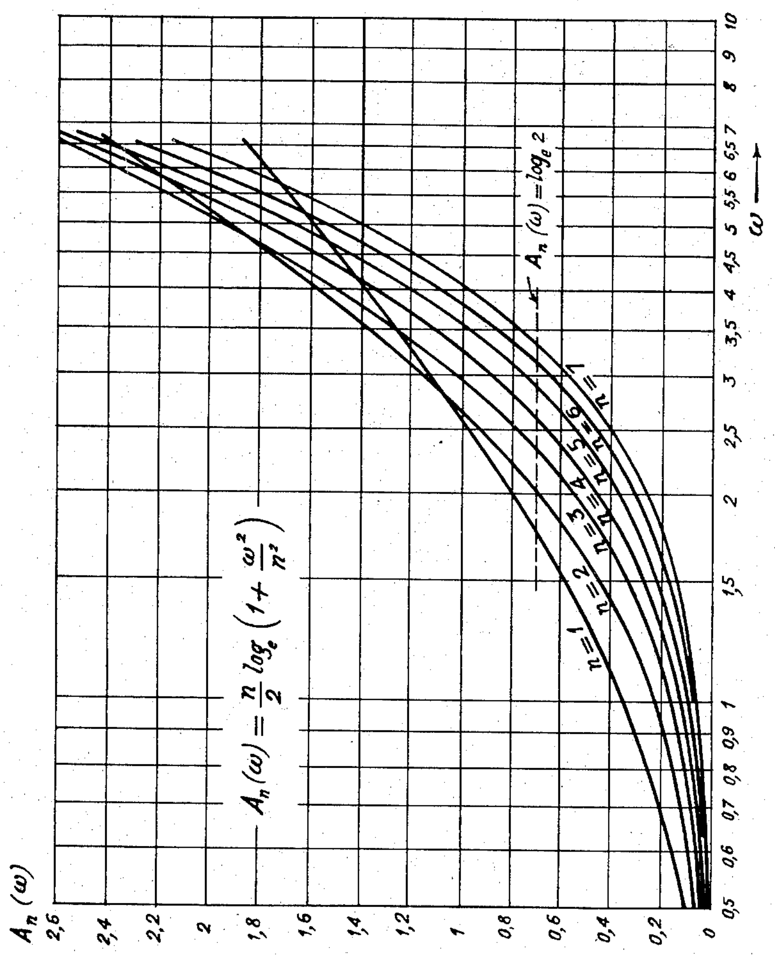
Figure 4 shows curves which give, for several values of $n$, the attenuation caused by the network as a function of the angular frequency $\omega$.

In all figures representing the delay network, the input terminals of the latter are designated 1—1′ and the output terminals 2—2′. Properties and advantages of the networks of the invention will be first explained and methods for their calculation will be given thereafter.

It has been seen that the transfer function of the network comprising a total of $n$ elements should be proportional to:

$$T(p)=\left(1+\frac{p}{n}\right)^n \qquad (1)$$

If $n$ increases indefinitely, the transfer function thus becomes, in accordance with a well known mathematical property:

$$\lim_{n=\infty} T_n(p)=e^p \qquad (2)$$

The exact definitions of the transfer function for the various cases of Figures 1 to 3 are given hereinafter:

When (Figure 1) the delay network Q is inserted between a voltage source 3 having an internal resistance $R_1$ and a load 4 having a resistance $R_2$, the transfer function $T(p)$ is defined by the ratio:

$$\frac{E}{U}\frac{R_2}{R_1+R_2} \qquad (2a)$$

in which E is the electromotive force at the input and U the output voltage, E and U being complex quantities.

When (Figure 2) the delay network Q is inserted between a voltage source 5 having an internal resistance R and a load 6, with an infinite impedance, the transfer function $T(p)$ is defined by the ratio:

$$\frac{E}{U}$$

of the input electromotive force to the output voltage.

Finally when (Figure 3) the delay network Q is inserted betwten a current source 7 with an infinite internal impedance and a load 6 having a resistance R, the transfer function $T(p)$ is defined by the quotient $$\frac{RI}{U}$$

where I is the input current.

The case of Figure 3 will not be separated hereinafter from the case of Figure 2 as, once the elements of the network Q in Figure 2 have been calculated, it is sufficient to turn the figure over, end to end, the terminals 2—2′ being connected with the current generator of infinite impedance and the terminals 1—1′ with the load of resistance R for obtaining a network Q having the transfer function $T(p)$ in the sense of Figure 2.

To sum up, the values of the network elements will be calculated in three hypotheses:

The network is inserted between a source of resistance $R_1$ and a load of resistance $R_2$;

The network is inserted betwen a source and a load of equal resistance R;

The network is inserted between a source having a finite resistance and a load having an infinite impedance.

Assuming a network to be realized, meeting the above specified conditions, its transmission properties are as follows:

The attenuation in cisoidal conditions (i. e. when E or I are functions of the type $Ee^{j\omega t}$ or $Ie^{j\omega t}$, $t$ being the time), is given, taking $p=j\omega$, which is possible by a suitable choice of the frequency unit (or of the time unit), by:

$$A_n(\omega)=\log_e|T_n(j\omega)|=\log_e\left(1+\frac{\omega^2}{n^2}\right)^{n/2}=\frac{n}{2}\log_e\left(1+\frac{\omega^2}{n^2}\right) \qquad (3)$$

The variations of $A_n(\omega)$ as a function of $\omega$ are given, for various values of $n$ by table I and in Figure 4.

The 6 db band width is defined, since a 6 db attenuation corresponds substantially to an amplitude ratio equal to 2, by $$A_n(\omega_n)=\log_e^2$$

i. e.

$$\omega_n=n\sqrt{2^{2/n}-1} \qquad (4)$$

This bandwidth is represented by the curve in Figure 5.

The phase shift in cisoidal conditions, is:

$$B_n(\omega)=\text{phase } T_n(j\omega)=n\tan^{-1}\frac{\omega^2}{n} \qquad (5)$$

Figure 6:
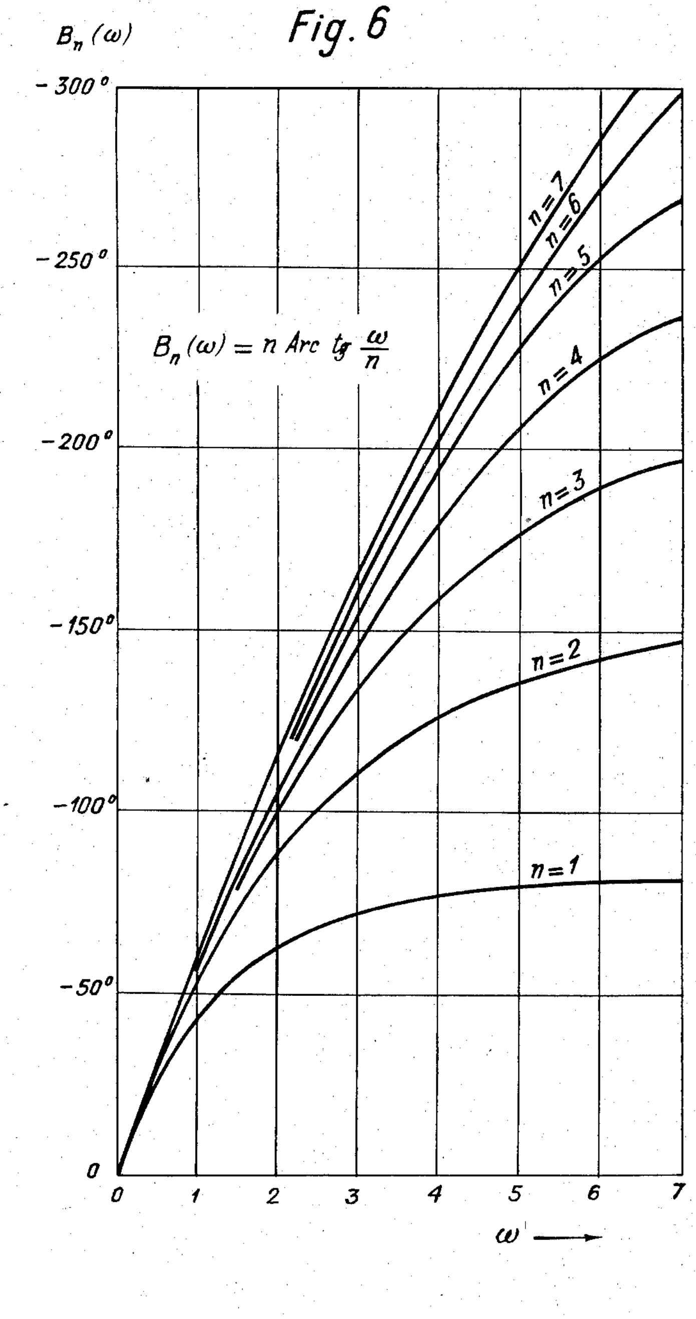
Figure 6 shows curves which give, for several values of $n$ the values of the phase shift introduced by the network as a function of the angular frequency.

The variations of $B_n(\omega)$ as function of $\omega$ are given in Figure 6 for various values of $n$.

The group propagation time in cisoidal conditions is $$\tau_n(\omega)=\frac{dB_n(\omega)}{d\omega}=\frac{1}{1+\frac{\omega^2}{n^2}} \qquad (6)$$

Figure 7:
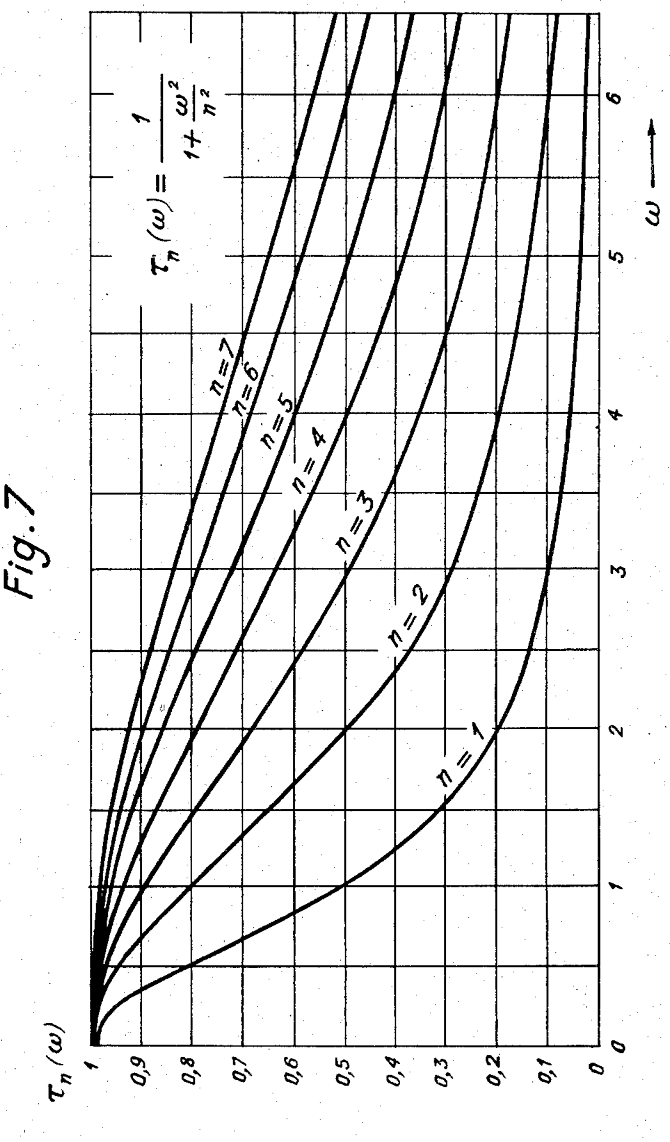
Figure 7 shows curves giving, for several values of $n$, the group propagation time of the network as a function of the angular frequency.

The variations of $\tau_n(\omega)$ as a function of $\omega$ are given, for various values of $n$, by Figure 14 and Figure 7. It will be seen that $\tau_n(\omega)$ approaches 1 whatever may be the value of $\omega$ when $n$ increases indefinitely. It will be seen further, from Formula 4 that the 6 db bandwidth increases indefinitely with $n$. The result is that when $n$ increases indefinitely, the network tends to behave like an ideal delay network which would cause the same delay, taken as a time unit, to all the spectral components of the input signal and which would cause no attenuation distortion, since the 6 db bandwith, and more generally the bandwidth for a lower attenuation of any number of decibels lower than 6 may be made as large as desired.

In transient conditions, the network also tends to behave like an ideal delay line when $n$ increases indefinitely.

Let $u_n(t)$ be the pulse response of the network to the action of a unit pulse $\delta(t)$ and $U_n(p)$ the Laplace transform of $u_n(t)$. Taking into account the fact that the unit pulse $\delta(t)$ is the time derivative of the unit step $Y(t)$, i. e.

$$\delta(t)\sqsupset 1$$

the symbol $\sqsupset$ denoting Laplace's transformation, i. e., transforming a time function into a function of complex frequency. Wherever it appears, the symbol $\sqsubset$ denotes the inverse transformation, i. e., taking the Fourier's integral of a function of complex frequency so as to transform it into a function of time, it is found that:

$$U_n(p)=1\cdot\frac{1}{\left(1+\frac{p}{n}\right)^n}$$

But it is known that $$\frac{1}{(p+\lambda)^n}\sqsubset\frac{t^{n-1}e^{-\lambda t}}{(n-1)!}Y(t)$$

with the result that:

$$u_n(t)=\frac{n^n}{(n-1)!}t^{n-1}e^{-nt}Y(t)$$

Figure 8:
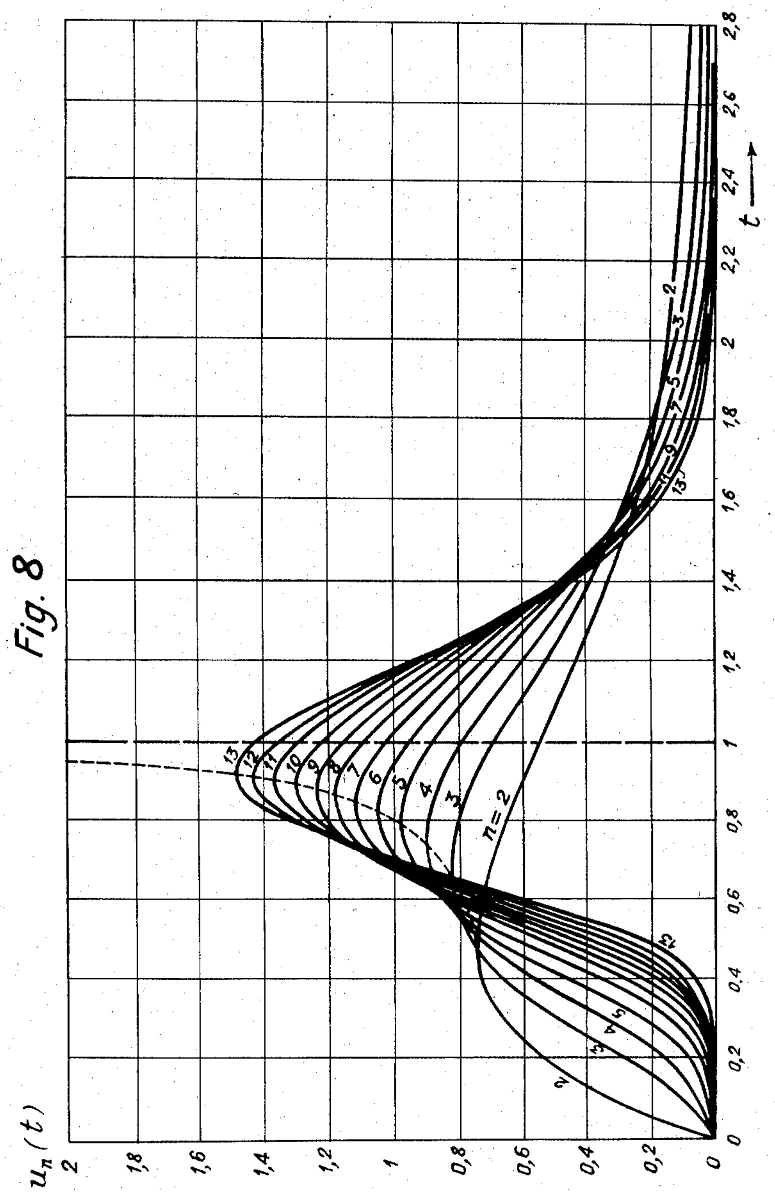
Figure 8 shows curves giving, for several values of $n$, the response of the network to a so-called "unit-step signal"

This pulse response is represented, as a function of time $t$ in Figure 8 for various values of $n$. It is known that $u_n(t)$ is maximum when $$t=t_n=1-\frac{1}{n} \qquad (7)$$

It may be seen that the delay given by Formula 7 approaches 1 when $n$ increases indefinitely.

The maximum value of $u_n(t)$ is:

$$u_{\max}=\frac{n(n-1)^{n-1}}{(n-1)!\,e^{(n-1)}}$$

and when $n$ becomes infinite $u_{n_{\max}}$ is approximately equal to $$\sqrt{\frac{n+1}{2\Pi}}$$

as may be seen by applying Sterling's formula.

The fact that when $n$ is infinite the network behaves like an ideal delay network also results from the very choice of the transfer function as has been explained at the beginning of this specification.

The properties of networks having a transfer function with the mathematical form given above having thus been set forth, their modes of construction will now be described.

The values of the elements of the networks which are the object of this invention will be given in the shape of quantities designated by the notations "$a$" or "$b$" according to whether they designate inductances $L_k$ or condensers $C_k$, the letters "$a$" or "$b$" being assigned a subscript corresponding to the rank $k$ of the element, counted from the input to the network. The numbers $a_k$ or $b_k$ will be the values of the reactances or admittances of said elements, divided by R, $R_1$ or $R_2$ according to the case considered and referred to the angular frequency $\omega_0=1/\tau$. Thus $$a_k=L_k\frac{\omega_0}{R}$$

and $b_k=C_k\omega_0R$, for instance.

Figure 9:
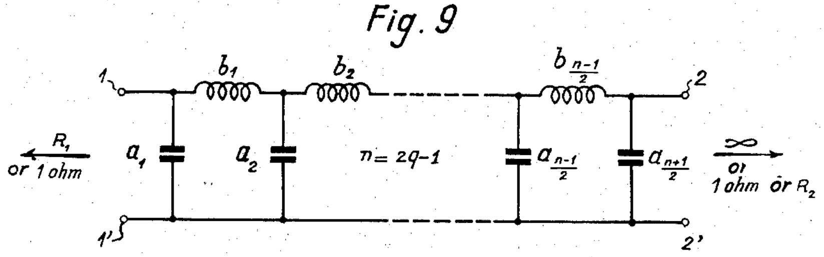
Figures 9 to 12 represent, diagrammatically the delay networks of the invention.
Figure 10:
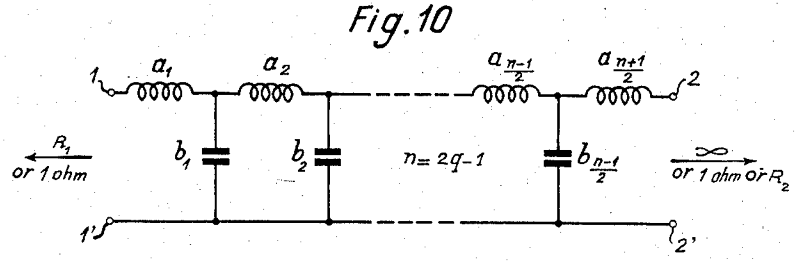

In the case of Figure 2, where the load impedance is infinite the values of the elements of the ladder type network are given as general formulae, by Figure 15, given hereinafter, and as numerical values up to $n=9$ in Figure 16, attached. The corresponding networks are represented in Figures 9 and 10 for the case of $n$ odd and in Figures 11 and 12 for the case when $n$ is even. The network of Figure 10 is derived by duality from the network of Figure 9 and, similarly the network of Figure 12 is derived from the network of Figure 11.

In all cases, the network comprises only series inductances and shunt condensers, which results obviously from the fact that $T_n(p)$ is a polynomial. For an even value of $n$ ($n=29$), the network comprises $n/2$ L-type sections, the $a$'s being the values of the series inductances and the $b$'s the values of the shunt capacitances for the network of Figure 11, and the functions of the $a$'s and $b$'s being interchanged in the case of the network of Figure 12. For an odd value of $n$ ($n=29-1$) the network comprises $$\frac{n-1}{2}$$

L-type sections and an additional shunt capacitance in the case of Figure 9 or an additional series inductance in the case of Figure 10. The $a$'s are the values of the shunt capacitances and the $b$'s the values of the series of inductances for the network of Figure 9 and the functions of the $a$'s and $b$'s are interchanged in the case of the network of Figure 10. In all cases the number of elements of the network is equal to $n$, for having a transfer function equal to $T_n(p)$.

The mode of calculation of the coefficients $a$'s and $b$'s will now be explained, assuming $R_1$ smaller than $R_2$, and assuming $R_1$ to be the internal resistance of the source and $R_2$ to be that of the load circuit, and designating by $\lambda$ the quantity $$\frac{2\sqrt{R_1R_2}}{R_1+R_2}$$

One can always get back to the particular case contemplated by exchanging, if necessary, the functions of the load circuit and of the source, as allowed by Lord Rayleigh's reciprocity theorem.

In these conditions, the ratio of the electromotive force E applied to the input to the network to the voltage U present at the terminals of the load circuit is equal to $$\frac{E}{U}=\frac{R_1+R_2}{R_1}\left(1+\frac{p}{n}\right)^n=\frac{R_1+R_2}{R_2}T(p)$$

Designating respectively by $T'(p)$ and $T''(p)$ the odd and even portions of the polynomial $T(p)$, a polynomial $S(p)$, the expression of which will be given later, is formed such that:

$$S(p)S(-p)=T(p)T(-p)-\lambda^2 \qquad (8)$$

Letting, similarly $$S(p)=S'(p)+S''(p) \qquad (9)$$

where $S'(p)$ is the odd part and $S''(p)$ the even part of $S(p)$, it is sufficient to form, according to that one of four possible cases respectively corresponding to Figures 9, 10, 11 and 12 one of the quantities $H_1'(p)$, $H_1''(p)$, $H_2'(p)$, $H_2''(p)$, defined below:

(1) $n$ is odd and it is desired to obtain a network of the type of Figure 9, i. e. terminated at each end by a condenser.

In this case the expression is formed:

$$\frac{1}{H_1'(p)}=\frac{T''(p)-S''(p)}{T'(p)+S'(p)} \qquad (10)$$

It may be shown that this expression is equal to the product of the reciprocal of the input impedance of the network, measured with its output terminals short-circuited, by the value of $R_1$. Thus:

$$H_1'(p)=a_1p+\cfrac{1}{b_1p+\cfrac{1}{a_2p+\cfrac{1}{b_2p+\cdots\cdots+\cfrac{1}{b_{\frac{n-1}{2}}p+\cfrac{1}{a_{\frac{n+1}{2}}p}}}}}$$

The values of the capacities of the condensers are then obtained by dividing the coefficients $a$ by $\omega_0R_1$ and those of the inductances by multiplying the coefficients $b$ by $R_1/\omega_0$.

(2) $n$ is odd, and it is desired to obtain a network of the type of Figure 10, i. e. terminated at each end by an inductance.

In this case, $H'_1(p)$ is calculated as previously but, for calculating the values of the inductances and capacities of the condensers, the values of the quantities $a$ and $b$ are interchanged and $R_1$ is replaced by $R_2$.

Figure 11:
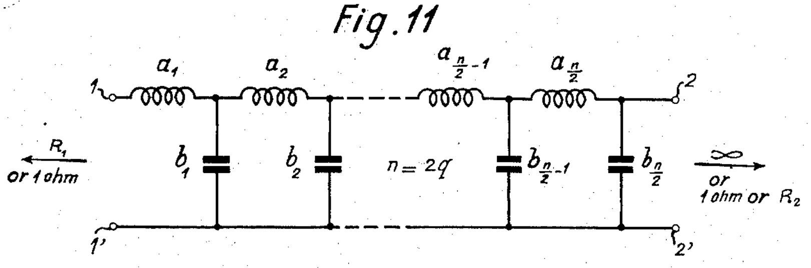
Figure 12:
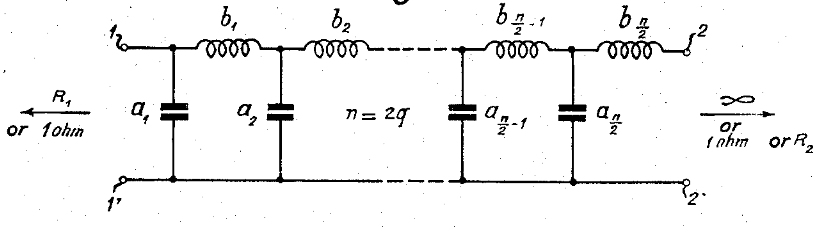

(3) $n$ is even, and it is desired to obtain a network of the type of Figure 11 of the main patent, i. e. beginning, on the source side, by an inductance, and terminating, on the load side, by a condenser.

In this case, the expression is formed:

$$H_1''(p)=\frac{T''(p)+S''(p)}{T'(p)-S'(p)} \qquad (11)$$

It may be shown that this expression is equal to the quotient of the input impedance of the network, measured with its output terminals in open circuit by the value of $R_1$. Thus:

$$H_1''(p)=a_1p+\cfrac{1}{b_1p+\cfrac{1}{b_2p+\cfrac{1}{b_2p+\cdots\cdots+\cfrac{1}{a_{\frac{n}{2}}p+\cfrac{1}{b_{\frac{n}{2}}p}}}}}$$

The values of the capacities of the condensers are then obtained by dividing the coefficients $b$ by $\omega_0 R_1$ and those of the inductances by multiplying the coefficients $a$ by $R_1/\omega_0$.

(4) $n$ is even, and it is desired to obtain a network of the type of Figure 12 of the main patent, i. e. beginning, on the source side by a condenser and terminating, on the load circuit side, by an inductance.

In this case, $H_1''(p)$ in calculated as in (3) but, for calculating the values of the inductances and of the condensers, the values of the quantities $a$ and $b$ are interchanged and $R_1$ is replaced by $R_2$.

Of course, a modification of the above calculation is possible for determining the inductances and condensers, starting from the output resistance $R_2$ of the network instead of the input resistance $R_1$. In this case, expressions $H_2'(p)$ and $H_2''(p)$ are formed, slightly different from $H_1'(p)$ and $H_1''(p)$, as follows:

$$\frac{1}{H_2'(p)}=\frac{T''(p)+S''(p)}{T'(p)+S'(p)}\ (n \text{ odd}) \qquad (12)$$

$$H_2''(p)=\frac{T''(p)+S''(p)}{T'(p)+S'(p)}\ (n \text{ even}) \qquad (13)$$

The calculation is carried out in the same manner, but by replacing $R_1$ by $R_2$, and vice versa. It should be noted that, in this case, the order of the subscripts of the quantities $a$ and $b$ is interchanged and that, in the case of $n$ odd, the first term of the development into a continuous fraction will have, therefore, the subscript $$\frac{n+1}{2}$$

and, for the case of $n$ even, the subscript $$\frac{n}{2}$$

In the case of the networks or Figures 9 and 10, the development of $H_2'(p)$ begins with a term in $$a_{\frac{n+1}{2}}$$

and, in the case of the networks of Figures 11 and 12 the first term in the development of $H_2''(p)$ will be a term in $$b_{\frac{n}{2}}$$

It has been found that in the general case where $R_1$ is different from $R_2$, as well as in the case, in which $R_1$ and $R_2$ are equal, and have the same value R, it is possible to express the polynomials $S(p)$ explicitly in the following manner:

In the general case, letting, as already mentioned:

$$\lambda=\frac{2\sqrt{R_1R_2}}{R_1+R_2}$$

and setting, further, $$x=\frac{p}{n} \text{ and } \mu=\sqrt[n]{\lambda 2} \qquad (14)$$

and $$\Delta=1-2\mu\cos\frac{2k\pi}{n}+\mu^2 \qquad (15)$$

where $k$ is a summation subscript, it was found that (1) In case $n$ is odd:

$$S(p)=(x+\sqrt{1-\mu})\prod_{k=1}^{\frac{n-1}{2}}\left[x^2+x\sqrt{2-2\mu\cos\frac{2k\pi}{n}+2\sqrt{\Delta}}+\sqrt{\Delta}\right] \qquad (16)$$

$$S(p)=(x+\sqrt{1-\mu})(x+\sqrt{1+\mu})\prod_{k=1}^{\frac{n}{2}-1}\left[x^2+x\sqrt{2-2\mu\cos\frac{2k\pi}{n}+2\sqrt{\Delta}}+\sqrt{\Delta}\right] \qquad (17)$$

$$S(p)=x\prod_{k=1}^{\frac{n-1}{2}}\left[x^2+2x\sin\left(\frac{k\pi}{2n}+\frac{\pi}{4}\right)\sqrt{2\sin\frac{k\pi}{n}}+2\sin\frac{k\pi}{n}\right] \qquad (16')$$

$$S(p)=x(x+\sqrt{2})\prod_{k=1}^{\frac{n}{2}-1}\left[x^2+2x\sin\left(\frac{k\pi}{2n}+\frac{\pi}{4}\right)\sqrt{2\sin\frac{k\pi}{2n}}+2\sin\frac{k\pi}{n}\right] \qquad (17')$$

It is recalled that the symbol $\Pi$ denotes the product of a number of factors, each one of the latter corresponding to a different value of the index K which, in the above formulae, takes every successive integer value from $$1 \text{ to } \left(\frac{n-1}{2}\right) \text{ or from } 1 \text{ to } \left(\frac{n}{2}-1\right)$$

according to whether $n$ is odd or even.

A second solution for the network may still be obtained by replacing, in the expressions for $H_1'(p)$, $H_1''(p)$, $H_2'(p)$ and $H_2''(p)$, the quantity $S''(p)$ by $-S''(p)$ for the case of $n$ odd or the quantity $S'(p)$ by $-S'(p)$ for the case of $n$ even. The calculations are carried out for the rest in the same manner as in the above mentioned cases.

In the case where one of the terminal resistances of the network, the output resistance for instance, is infinite, the calculations become simpler as $\lambda$ becomes zero and $S(p)$ identical with $T(p)$. This, however, results in that Formulae 10 and 11 are no more applicable, and that it is the just mentioned second solution that is valid. The calculations should then be effected by using Expressions 12 and 13. It is obvious, since $T(p)$ is identical with $S(p)$, that the expression for $1/H_1'(p)$, for instance, may be written:

$$\frac{\left(1+\frac{p}{n}\right)^n+\left(1-\frac{p}{n}\right)^n}{\left(1+\frac{p}{n}\right)^n-\left(1-\frac{p}{n}\right)^n} \qquad (18)$$

The expression for $H_1''(p)$ is the reciprocal of the latter.

The appended tables contained in Figs. 13 to 17 give formulae for the calculation of a network according to the invention in the case of an infinite input or output resistance. It may be shown that the Expression 18 is equal to the value of the input impedance $Z_{11}$ of the network, with its output terminals open-circuited, divided by the resistance R connected at its input terminals. The tables give data for calculating the values of the $a$'s and $b$'s for the latter case, while the tables give similar data for the case of equal input and output resistances. In this case, a second solution may, of course, be obtained by turning over the network end to end, i. e. by reversing the order of the subscripts of the $a$'s and $b$'s.

The continuous fraction developments mentioned above are always possible, since the expressions to be developed have numerators including even terms only and denominators including odd terms only, or reciprocally.

I claim:

1. A ladder type delay network with a delay time $\tau$ substantially independent of frequency, having input and output terminals for insertion between an alternating current signal source of internal resistance $R_1$ and an infinite output impedance, said network comprising an odd total number $n$ of series inductances and shunt condensers, wherein the successive values of the elements of said network starting from said input terminals are given by the development of the expression $$\frac{\left(1+\frac{p}{n}\right)^n+\left(1-\frac{p}{n}\right)^n}{\left(1+\frac{p}{n}\right)^n-\left(1-\frac{p}{n}\right)^n}$$

into a continuous fraction with respect to the variable $p$, the values of the capacities of the condensers being equal to the coefficients of $p$ of an odd rank of said development divided by $\omega_0 R_1$, where $\omega_0$ equals $1/\tau$, and the values of the inductances being equal to the coefficients of $p$ of an even rank of said development multiplied by $R_1/\omega_0$.

2. A ladder type delay network with a delay time $\tau$ substantially independent of frequency, having input and output terminals for insertion between an alternating current signal source of internal resistance $R_1$ and an infinite output impedance, said network comprising an even total number $n$ of series inductances and shunt condensers, wherein the successive values of the elements of said network starting from said input terminals are given by the development of the expression $$\frac{\left(1+\frac{p}{n}\right)^n+\left(1-\frac{p}{n}\right)^n}{\left(1+\frac{p}{n}\right)^n-\left(1-\frac{p}{n}\right)^n}$$

into a continuous fraction with respect to the variable $p$, the values of the capacities of the condensers being equal to the coefficients of $p$ of an even rank of said development divided by $\omega_0 R_1$, where $\omega_0$ equals $1/\tau$, and the values of the inductances being equal to the coefficients of $p$ of an odd rank of said development multiplied by $R_1/\omega_0$.

3. A ladder type delay network with a delay time $\tau$ substantially independent of frequency, having input and output terminals for insertion between an alternating current signal source of internal resistance $R_1$ and a utilization circuit of resistance $R_2$ higher than $R_1$, said network comprising an odd total number $n$ of series inductances and shunt condensers, wherein, designating by $\lambda$ the quantity $2\sqrt{R_1R_2}/(R_1+R_2)$, by $\mu$ the quantity $$\sqrt[n]{\lambda^2}$$

by $\Delta$ the quantity $$\left(1-2\mu\cos\frac{2k\pi}{n}+\mu^2\right)$$

by $x$ the quantity $p/n$, by $T(p)$ the quantity $$\left(1+\frac{p}{n}\right)^n$$

and by $S(p)$ the quantity $$(x+\sqrt{1-\mu})\prod_{k=1}^{\frac{n-1}{2}}\left[x^2+x\sqrt{2-2\mu\cos\frac{2k\pi}{n}+2\sqrt{\Delta}}+\sqrt{\Delta}\right]$$

and designating respectively by $S'(p)$, $S''(p)$, $T'(p)$ and $T''(p)$ the odd and even parts of the polynomials $S(p)$ and $T(p)$, the values of the elements of said network are related by the expression $$\frac{T'(p)+S'(p)}{T''(p)\pm S''(p)}$$

the successive values of the elements of said network counted from said input terminals resulting in said expression developed into a continuous fraction with respect to the variable $p$, the capacities of the condensers being the coefficients of $p$ of an odd rank in said development divided by $\omega_0 R_1$, where $\omega_0$ equals $1/\tau$, and the values of the inductances being the coefficients of $p$ of an even rank in said development multiplied by $R_1/\omega_0$.

4. A ladder type delay network with a delay time $\tau$ substantially independent of frequency, having input and output terminals for insertion between an alternating current signal source of internal resistance $R_1$ and a utilization circuit of resistance $R_2$ higher than $R_1$, said network comprising an odd total number $n$ of series inductances and shunt condensers, wherein, designating by $\lambda$ the quantity $2\sqrt{R_1R_2}/(R_1+R_2)$, by $\mu$ the quantity $$\sqrt[n]{\lambda^2}$$

by $\Delta$ the quantity $$\left(1-2\mu\cos\frac{2k\pi}{n}+\mu^2\right)$$

by $x$ the quantity $p/n$, by $T(p)$ the quantity $$\left(1+\frac{p}{n}\right)^n$$

and by $S(p)$ the quantity $$(x+\sqrt{1-\mu})\prod_{k=1}^{\frac{n-1}{2}}\left[x^2+x\sqrt{2-2\mu\cos\frac{2k\pi}{n}+2\sqrt{\Delta}}+\sqrt{\Delta}\right]$$

and designating respectively by $S'(p)$, $S''(p)$, $T'(p)$ and $T''(p)$ the odd and even parts of the polynomials $S(p)$ and $T(p)$, the values of the elements of said network are related by the expression $$\frac{T'(p)+S'(p)}{T''(p)\pm S''(p)}$$

the sucessive values of the elements of said network counted from said input terminals resulting in said expression developed into a continuous fraction with respect to the variable $p$, the capacities of the condensers being the coefficients of $p$ of an even rank in said development divided by $\omega_0 R_1$, where $\omega_0$ equals $1/\tau$, and the values of the inductances being the coefficients of $p$ of an odd rank in said development multiplied by $R_1/\omega_0$.

5. A ladder type delay network with a delay time $\tau$ substantially independent of frequency, having input and output terminals for insertion between an alternating current signal source of internal resistance $R_1$ and a utilization circuit of resistance $R_2$ higher than $R_1$, said network comprising an even total number $n$ of series inductances and shunt condensers, wherein, designating by $\lambda$ the quantity $2\sqrt{R_1R_2}/(R_1+R_2)$, by $\mu$ the quantity $$\sqrt[n]{\lambda^2}$$

by $\Delta$ the quantity $$\left(1-2\mu\cos\frac{2k\pi}{n}+\mu^2\right)$$

by $x$ the quantity $p/n$, by $T(p)$ the quantity $$\left(1+\frac{p}{n}\right)^n$$

and by $S(p)$ the quantity $$(x+\sqrt{1+\mu})(x+\sqrt{1+\mu})\prod_{k=1}^{\frac{n}{2}-1}\left[x^2+x\sqrt{2-2\mu\cos\frac{2k\pi}{n}+\sqrt{\Delta}}+\sqrt{\Delta}\right]$$

and designating respectively by $S'(p)$, $S''(p)$, $T'(p)$ and $T''(p)$ the odd and even parts of the polynominals $S(p)$ and $T(p)$, the values of the elements of said network are related by the expression $$\frac{T''(p)+S''(p)}{T'(p)\pm S'(p)}$$

the successive values of the elements of said network counted from said input terminals resulting in said expression developed into a continuous fraction with respect to the variable $p$, the capacities of the condensers being the coefficients of $p$ of an even rank in said development divided by $\omega_0 R_1$, where $\omega_0$ equals $1/\tau$, and the values of the inductances being the coefficients of $p$ of an odd rank in said development multiplied by $R_1/\omega_0$.

6. A ladder type delay network with a delay time $\tau$ substantially independent of frequency, having input and output terminals for insertion between an alternating current signal source of internal resistance $R_1$ and a utilization circuit of resistance $R_2$ higher than $R_1$, said network comprising an even total number $n$ of series inductances and shunt condensers, wherein, designating by $\lambda$ the quantity $2\sqrt{R_1R_2}/(R_1+R_2)$, by $\mu$ the quantity $$\sqrt[n]{\lambda^2}$$

by $\Delta$ the quantity $$\left(1-2\mu\cos\frac{2k\pi}{n}+\mu^2\right)$$

by $x$ the quantity $p/n$, by $T(p)$ the quantity $$\left(1+\frac{p}{n}\right)^n$$

and by $S(p)$ the quantity $$(x+\sqrt{1+\mu})(x+\sqrt{1+\mu})\prod_{k=1}^{\frac{n}{1}-1}\left[x^2+x\sqrt{2-2\mu\cos\frac{2k\pi}{n}+\sqrt{\Delta}+\sqrt{\Delta}}\right]$$

and designating respectively by $S'(p)$, $S''(p)$, $T'(p)$ and $T''(p)$ the odd and even parts of the polynominals $S(p)$ and $T(p)$, the values of the elements of said network are related by the expression $$\frac{T''(p)+S''(p)}{T'(p)\pm S'(p)}$$

the successive values of the elements of said network counted from said input terminals resulting in said expression developed into a continuous fraction with respect to the variable $p$, the capacities of the condensers being the coefficients of $p$ of an odd rank in said development divided by $\omega_0 R_1$, where $\omega_0$ equals $1/\tau$, and the values of the inductances being the coefficients of $p$ of an even rank in said development multiplied by $R_1/\omega_0$.

References Cited in the file of this patent

UNITED STATES PATENTS

| | | |
|---|---|---|
| 1,788,538 | Norton | Jan. 13, 1931 |
| 2,710,944 | Bangert | June 14, 1955 |